(12) United States Patent
Carrier et al.

(10) Patent No.: US 10,144,810 B2
(45) Date of Patent: Dec. 4, 2018

(54) PVP COPOLYMER FOR HARSH CHEMICAL PACKAGING

(71) Applicant: Sekisui Specialty Chemicals America, LLC, Dallas, TX (US)

(72) Inventors: Paula Carrier, Houston, TX (US); Vinh Nguyen, Houston, TX (US); Regan Pollock, Houston, TX (US); Richard Vicari, Houston, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 946 days.

(21) Appl. No.: 14/060,051

(22) Filed: Oct. 22, 2013

(65) Prior Publication Data

US 2014/0110301 A1   Apr. 24, 2014

Related U.S. Application Data

(60) Provisional application No. 61/760,837, filed on Feb. 5, 2013, provisional application No. 61/716,900, filed on Oct. 22, 2012.

(51) Int. Cl.

| | |
|---|---|
| *C08J 5/18* | (2006.01) |
| *B65D 85/84* | (2006.01) |
| *B65D 65/46* | (2006.01) |
| *C08L 29/04* | (2006.01) |
| *C08K 5/151* | (2006.01) |
| *C08K 5/1545* | (2006.01) |
| *C08L 39/06* | (2006.01) |

(52) U.S. Cl.
CPC ............... *C08J 5/18* (2013.01); *B65D 65/46* (2013.01); *B65D 85/84* (2013.01); *C08K 5/151* (2013.01); *C08K 5/1545* (2013.01); *C08L 29/04* (2013.01); *C08L 39/06* (2013.01)

(58) Field of Classification Search
CPC ....... C08L 29/04; C08L 39/06; B65D 75/002; B65D 71/08; B65D 65/46; B65D 85/84; C08J 5/18
USPC .......................................... 206/524.7; 524/58
See application file for complete search history.

(56) References Cited

U.S. PATENT DOCUMENTS

| | | | | |
|---|---|---|---|---|
| 5,102,950 | A * | 4/1992 | Terada | C08F 8/12 264/331.12 |
| 6,166,117 | A | 12/2000 | Miyazaki | |
| 6,608,121 | B2 | 8/2003 | Isozaki et al. | |
| 6,787,512 | B1 | 9/2004 | Verrall et al. | |
| 6,821,590 | B2 | 11/2004 | Verrall et al. | |
| 6,956,070 | B2 | 10/2005 | Fujiwara et al. | |
| 7,005,168 | B2 | 2/2006 | Verrall et al. | |
| 7,022,656 | B2 | 4/2006 | Verrall et al. | |
| 7,642,226 | B2 | 1/2010 | Verrall et al. | |
| 7,745,517 | B2 * | 6/2010 | Vicari | B29C 41/28 524/47 |
| 7,786,229 | B2 | 8/2010 | Vicari | |
| 8,728,593 | B2 | 5/2014 | Vicari et al. | |
| 2002/0182348 | A1 * | 12/2002 | Fujiwara | B29D 7/01 428/35.2 |
| 2006/0275567 | A1 | 12/2006 | Vicari | |
| 2009/0054295 | A1 | 2/2009 | Vicari et al. | |
| 2010/0234492 | A1 | 9/2010 | Vicari et al. | |
| 2011/0188784 | A1 * | 8/2011 | Denome | B65D 65/46 383/1 |

FOREIGN PATENT DOCUMENTS

| | | |
|---|---|---|
| EP | 0354410 A2 | 2/1990 |
| EP | 2031049 A2 | 3/2009 |
| JP | 2003105105 A | 4/2003 |
| JP | 2004137361 A | 5/2004 |
| JP | 2009535484 A | 10/2009 |

OTHER PUBLICATIONS

International Search Report and Written Opinion dated Feb. 18, 2014 in corresponding PCT application No. PCT/US2013/066103 (11 pages).
Correspondence reporting an Official Letter dated Oct. 16, 2015 in corresponding Taiwan application No. 102137910 (8 pages).
Correspondence reporting an Official Letter and Search Report dated Dec. 16, 2014 in corresponding Taiwan application No. 102137910 (11 pages).
Notice of Rejection dated Aug. 19, 2016 in corresponding Korean applicaiton No. 10-2015-7013173 (w/translation) (13 pages).
Office Action issued in corresponding European Application No. 13789413.5 dated Jul. 31, 2017 (44 pages).

* cited by examiner

*Primary Examiner* — Yan Lan
(74) *Attorney, Agent, or Firm* — Osha Liang LLP

(57) ABSTRACT

A water soluble film useful in unit-dose chemical packaging is disclosed. The film may include: a water soluble saccharide and a polyvinyl alcohol copolymer consisting essentially of: (a) from 80 to 99 mole percent of vinyl alcohol and vinyl ester monomer; and (b) from 1 to 20 mole percent of a pyrrolidone comonomer. Such compositions may be used to provide a water-soluble film simultaneously satisfying requirements in regard to water solubility, biodegradability, and physical properties, even when used for packaging of harsh, oxidizing chemicals.

18 Claims, No Drawings

PVP COPOLYMER FOR HARSH CHEMICAL PACKAGING

CROSS-REFERENCE TO RELATED APPLICATIONS

This application, pursuant to 35 U.S.C. § 119(e), claims priority to U.S. Provisional Application Ser. Nos. 61/716,900, filed Oct. 22, 2012, and 61/760,837, filed Feb. 5, 2013, both of which are herein incorporated by reference in their entirety.

FIELD OF THE DISCLOSURE

Embodiments disclosed herein relate generally to water-soluble polyvinyl alcohol based films that exhibit stability when in contact with aggressive oxidizing chemicals. More specifically, embodiments disclosed herein relate to vinyl alcohol—vinyl pyrrolidone copolymers, and the use of films from such co-polymers for applications such as unit dose packaging of aggressive oxidizing chemicals.

BACKGROUND

Polyvinyl alcohol (PVOH) films are often used in the art to form unit dose packages, as the films exhibit good strength, impact resistance, and are soluble in water. The solubility of PVOH films, however, rapidly decreases when exposed to certain chemicals, such as oxidizing chemicals, acid chemicals, alkali chemicals, chlorine-containing substances, salts with polyvalent metals, boric acid, polyamines, insecticides, herbicides, among others. Thus, in applications which employ these types of chemicals, the use of PVOH packaging is restricted, as the effective shelf-life of the unit dose products is limited by their solubility in water.

Modified PVOH films, having co-monomers and/or various additives, have been shown to improve the chemical resistance of the films. For example, see U.S. Pat. Nos. 6,608,121, 6,166,117, 6,787,512, 6,821,590, 7,005,168, and 7,745,517, among others, disclosing use of various plasticizers, additives, and co-monomers such as N-vinylamide, carboxyl and carboxylate functional groups, sulfonic acid functional groups.

U.S. Pat. No. 5,102,950, assigned to Kuraray Co., Ltd., discloses a PVOH film formed from a copolymer consisting of vinyl alcohol units, vinyl ester units, and copolymerization units containing a 2-pyrrolidone ring. Other comonomers are also contemplated, including sulfonic acid groups, quaternary ammonium structures, and others. For use in dose packaging films, it is disclosed to use plasticizers such as a polyhydric alcohol and linear sugaralcohos having 4 to 6 carbon atoms.

U.S. Pat. No. 6,956,070 and EP1251147, also assigned to Kuraray Co., Ltd., teach that films containing a 2-pyrrolidone ring have a problem of insufficient cold water solubility. Instead, it is disclosed that it is possible to provide a water-soluble film simultaneously satisfying the requirements in regard to water solubility, biodegradability, and physical properties when the PVOH is modified with monomers including an N-vinylamide, a carboxyl group and lactone ring.

U.S. Pat. No. 6,166,117, also to Kuraray Co., Ltd., discloses a water-soluble film including a sulfonic acid group modified polyvinyl alcohol in admixture with gallic acid. In this patent, it is noted that 2-acrylamido-2-methylpropane-sulfonate-modified polyvinyl alcohols are unsuitable for storage of acidic chemicals for long periods of time, as they lose their function as a water-soluble film. The gallic acid is taught as necessary to achieve the desired properties.

SUMMARY OF THE DISCLOSURE

Surprisingly, contrary to the above-noted patents, it has been found that vinyl alcohol—vinyl pyrrolidone copolymers, or mixtures of such copolymers, may be used to provide a water-soluble film while simultaneously satisfying requirements in regard to water solubility, biodegradability, color, and other physical properties, even when used for packaging of harsh, oxidizing chemicals.

In one aspect, embodiments disclosed herein relate to a water soluble film useful in unit dose packaging. The water-soluble film may have stability when contacted with harsh chemicals, such as aggressive oxidizing chemicals, and may include: a polyvinyl alcohol copolymer consisting essentially of: (a) from 80 to 99 mole percent of vinyl alcohol and vinyl ester monomer; and (b) from 1 to 20 mole percent of a pyrrolidone comonomer; and a water-soluble saccharide.

In another aspect, embodiments disclosed herein relate to a unit dose package including: a polymeric dissolution packet comprising the film as described above; and a harsh chemical sealed in the polymeric dissolution packet.

Other aspects and advantages will be apparent from the following description and the appended claims.

DETAILED DESCRIPTION

In one aspect, embodiments disclosed herein relate to water-soluble polyvinyl alcohol based films that exhibit resistance to aggressive oxidizing chemicals. More specifically, embodiments disclosed herein relate to vinyl alcohol copolymers including a comonomer having a pyrrolidone ring substituent group, such as vinyl pyrrolidone, and the use of films from such copolymers for applications such as unit dose packaging of aggressive oxidizing chemicals.

Vinyl alcohol copolymers useful in embodiments disclosed herein may be formed via the copolymerization of a vinyl ester monomer and the pyrrolidone comonomer via bulk polymerization, solution polymerization, emulsion polymerization, suspension polymerization, and the like.

Vinyl esters monomers may include various aliphatic acids, such as vinyl formate, vinyl acetate, vinyl butyrate, vinyl pivalate, and vinyl versatate, among others.

Pyrrolidone comonomers may include compounds having a polymerizable carbon-carbon double bond and a pyrrolidone ring substituent group represented by the following formula:

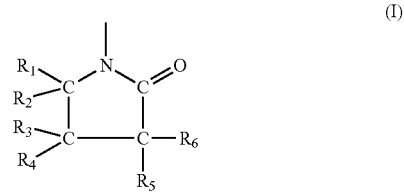

wherein $R_1$, $R_2$, $R_3$, $R_4$, $R_5$ and $R_6$ are each individually selected from a hydrogen atom or an alkyl group, such as an alkyl group having 1 to 8 carbon atoms. Examples of the group represented by the general formula (I) are 2-oxopyrrolidin-1-yl group, 3-propyl-2-oxopyrrolidin-1-yl group, 5-m ethyl-2-oxopyrrolidin-1-yl group, 5,5-dimethyl-2-oxopyrrolidin-1-yl group, 3,5-dimethyl-2-oxopyrrolidin-1-yl group, and the like. The carbon-carbon double bond contained in the pyrrolidone comonomer may include vinyl, allyl, styryl, acryloxy, methacryloxy, vinyloxy, allyloxyl, and other groups, that are copolymerizable with the above noted vinyl esters of aliphatic acids and have a high alkali resistance at the time of copolymer hydrolysis to form the vinyl alcohol copolymer. Examples of the pyrrolidone comonomers may include N-vinyl-2-pyrrolidone, N-vinyl-3-propyl-2-pyrrolidone, N-vinyl-5-methyl-2-pyrrolidone, N-vinyl-5,5-dimethyl-2-pyrrolidone, N-vinyl-3,5-dimethyl-2-pyrrolidone, and N-allyl-2-pyrrolidone, among others.

The vinyl ester copolymer thus obtained may be saponified to form a vinyl alcohol copolymer. The resulting vinyl alcohol copolymer may have a degree of hydrolysis in the range from about 65 to about 99%, in some embodiments; in the range from about 75 to about 95% in other embodiments, as indicated by $C^{13}$NMR analyses. The copolymer may have a relative molecular weight indicated by a characteristic viscosity in the range from about 2 to about 50 cps, in some embodiments; in the range from about 3 to about 30 cps or from about 7 to about 10 cps in other embodiments, where the viscosity is determined on a 4 wt % solution of the polymers in water, measured on a Brookfield viscometer at 20° C.

The saponified copolymer may have from about 1 mole % to about 20 mole % of the pyrrolidone comonomer in some embodiments. In other embodiments, the saponified copolymer may have from about 3 mole % to about 15 mole % pyrrolidone comonomer, such as from about 4 mole % to about 12 mole % or from about 5 mole % to about 10 mole %. In some embodiments, the copolymer is essentially free of other comonomers.

The vinyl alcohol copolymers described above, including pyrrolidone comonomers, may be used to form water soluble films, such as for unit dose packaging or other applications where water solubility of the film is a desired characteristic. In particular, such films may advantageously be used for unit dose packaging of harsh chemicals, where the unit dose package has a useful shelf life, even when stored at elevated temperature conditions for extended periods of time, such as those that may occur in storage facilities and/or during shipping.

Water soluble film formulations useful in embodiments herein may include a blend of the vinyl alcohol copolymer and a saccharide component. The saccharide component includes at least one water soluble saccharide, i.e., has a solubility in water at 25° C. of at least 0.1 moles per liter. The saccharide component may include oligosaccharides, disaccharides, monosaccharides, or combinations thereof. The saccharide component, as defined herein, does not include polysaccharides (starches). Non-limiting examples include glucose (dextrose), galactose, sucrose, fructose, lactose, maltose, mannose, trehalose, and combinations thereof. The saccharide component is preferably a mono- or di-saccharide, and is preferably crystalline.

The film formulations generally include the vinyl alcohol copolymer as the primary component. The saccharide component may be present in amounts ranging from about 1 wt % to 40 wt % in some embodiments; from about 1 wt % to about 25 wt %, from about 1 wt % to about 10 wt %, or from about 1 wt % to about 5 wt % in other embodiments.

The films may further include a chlorine scavenger or a bromine scavenger in amounts in the range from about 0.25 wt % to about 5 wt %, such as from about 0.5 wt % to about 2.5 wt %, or from about 1 wt % to about 2 wt %. Suitable chlorine scavengers may include thiosulfate salts, such as sodium thiosulfate. Other chlorine scavengers useful in embodiments herein may include: polymers such as polyethylene imines, polyamines, polyamineamides and polyacrylamides; anions selected from the group consisting of reducing materials like sulfite, bisulfite, thiosulfite, thiosulfate, iodide, nitrite, etc.; and antioxidants like carbamate, ascorbate, etc. and mixtures thereof. Conventional non-chlorine scavenging anions like sulfate, bisulfate, carbonate, bicarbonate, nitrate, chloride, borate, phosphate, condensed phosphate, acetate, benzoate, citrate, formate, lactate, salicylate, etc. and mixtures thereof can be used with ammonium cations. Further examples of chlorine scavengers useful in embodiments herein include ammonium sulfate (preferred), and primary and secondary amines of low volatility such as ethanolamines, amino acids and their salts, polyamino acids and their salts, fatty amines, glucoseamine and other aminated sugars, Specific examples include tris(hydroxymethyl) aminomethane, monoethanol amine, diethanol amine, sarcosine, glycine, iminodiacetic acid, lysine, ethylenediamine diacetic acid, 2,2,6,6-tetramethyl piperinol, and 2,2,6,6-tetramethyl piperinone.

Other components may also be added to the film compositions. For example, minor amounts of plasticizers, in addition to the saccharide component (the inclusion of the saccharide component may have some plasticizing effect on the film). Examples of plasticizers useful in embodiments disclosed herein may include polyethylene glycol (PEG), polypropylene glycol, trimethylene glycol, propylene glycol, 2,2,4-trimethyl-1,3-pentanediol, pentaerythritol, starch, or glycerine. Other additives useful in embodiments herein may include biocides, fillers, extenders, antiblocking agents, anti-slipping agents, detackifying agents, anti-foaming agents, UV stabilizers, lubricants, release agents, pigments, and dyes, among other additives. In various embodiments, additives may include at least one of polyethylene glycol, glycerine, ammonium chloride, citric acid, trimethylol propane, alkoxylated trimethylol propane, potassium bicarbonate, and ammonium chloride. Plasticizers may be used, in some embodiments, in amounts ranging from about 0.1 to about 25 wt %, such as in the range from about 1 to about 20 wt % or from about 1 to about 15 wt %, from about 1 to about 10 wt %, or from 1 to about 5 wt % in other embodiments.

In some embodiments, the vinyl alcohol copolymers described above, including pyrrolidone comonomers, may be used in admixture with one or more additional polyvinyl alcohol copolymers to form films and unit dose packages, among other useful products. The additional polyvinyl alcohol copolymers may include, for example, polyvinyl alcohol copolymers including comonomers containing sulfonic acid groups. Examples of the comonomers containing sulfonic acid groups may include vinyl sulfonic acid, allyl sulfonic acid, ethylene sulfonic acid, 2-acrylamido-1-methylpropanesulfonic acid, 2-acrylamido-2-methylpropanesulfonic acid (AMPS), 2-methacrylamido-2-methylpropanesulfonic acid, 2-sulfoethyl acrylate, and salts thereof, among others, where the comonomers may be incorporated into the polymer in amounts ranging from about 1 to about 6 mole % (94 to 99 mole percent of vinyl alcohol and vinyl ester monomer), such as in the range from about 2 to about 5 mole % or from about 3 to about 4.25 mole % in other embodiments.

As described in the Examples below, blends of the pyrrolodine containing polyvinyl alcohol copolymers and sulfonic acid group containing polyvinyl alcohol copolymers may result in improved unit dose packaging, where it its theorized that the AMPS containing copolymer provide for enhanced solubility while the pyrrolidone containing copolymer may provide for color stability and/or flexibility of the film, even after exposure to harsh chemicals for extended periods of time at elevated temperatures.

The blends of the pyrrolodine containing polyvinyl alcohol copolymers and sulfonic acid group containing polyvinyl alcohol copolymers may contain from 10 to 90 wt % of the pyrrolodine containing polyvinyl alcohol copolymers and from 90 to 10 wt % of the sulfonic acid group containing polyvinyl alcohol copolymer in some embodiments; from 15 to 85 wt % of the pyrrolodine containing polyvinyl alcohol copolymers and from 85 to 15 wt % of the sulfonic acid group containing polyvinyl alcohol copolymer in other embodiments; and from 20 to 80 wt % wt % of the pyrrolodine containing polyvinyl alcohol copolymers and from 80 to 20 wt % of the sulfonic acid group containing polyvinyl alcohol copolymer in yet other embodiments, the above percentages based on the total amount of polyvinyl alcohol copolymers. In some embodiments the blends may include from about 20 to 30 wt % of the pyrrolodine containing polyvinyl alcohol copolymers and from about 70 to 80 wt % of the sulfonic acid group containing polyvinyl alcohol copolymer, based on the total amount of polyvinyl alcohol copolymers. In other embodiments, the water-soluble film may include the pyrrolodine containing polyvinyl alcohol copolymers (A) and the sulfonic acid group containing polyvinyl alcohol copolymer (B) at a weight ratio A:B in the range from about 1:4 to about 4:1, such as at a weight ratio of A:B in the range from about 1:2.5 to about 1:3.25.

The components of the film formulations may be blended together prior to film fabrication by any suitable means. For example, the saccharide component and/or chlorine scavenger is dissolved in and/or blended with the vinyl alcohol copolymer or an aqueous solution of the vinyl alcohol copolymer.

The blend may then be used to produce water soluble films. Suitable film forming methods may include film casting, wet process film formation, dry process film formation, film extrusion, melting film formation, coating process and blown film methods, among others.

In some embodiments, the film is formed by a solution casting processes. An aqueous solution of the film may be prepared at about 10 to 30 percent solids by weight. The solution may then be added to a trough on a metal forming belt and a doctor blade spreads the solution out on the belt to a predetermined thickness. The belt is then passed through an oven to evaporate the water, which dries the film to a moisture content of about 6 to 15%. The polymer films may be fabricated to thickness in ranges of from about 10 to 200 microns, for example, such as from about 20 to 150 microns, or from about 50 to about 100 microns.

The water soluble films that may be produced with the vinyl alcohol copolymers described herein are useful for any purpose where water solubility is an advantage. As noted earlier, the films are particularly suitable for unit-dose packaging of harsh oxidizing chemicals, such as may be found in agricultural chemicals, microbiocides and the like, where the chemicals in unit dose packaged form are placed into water so that the contents are dissolved or dispersed in the water. This is accomplished without the necessity of the user directly touching the harmful chemicals, and without the need to measure the chemicals, as the unit dose package contains a known quantity of the chemical. Examples of oxidizing chemicals that may be packaged using films according to embodiments herein may include: peroxides such as barium peroxide, sodium carbonate peroxide, calcium peroxide, hydrogen peroxide, lithium peroxide, magnesium peroxide, strontium peroxide, zinc peroxide, and sodium peroxide; ketone peroxides such as acetone peroxide, methyl ethyl ketone peroxide, and benzoyl peroxide; nitrates such as aluminum nitrate, potassium nitrate, silver nitrate, calcium nitrate, sodium nitrate, cupric nitrate, lead nitrate, magnesium nitrate, strontium nitrate, nickel nitrate, and guanidine nitrate; nitrites such as sodium nitrite; chromates and dichromates such as potassium dichromate, sodium dichromate, and ammonium dichromate; sulfates and persulfates such as ammonium persulfate, potassium persulfate and sodium persulfate; borates and perborates such as sodium perborate; perbromates and bromates such as potassium bromate and sodium bromate; permanganates such as potassium permanganates, sodium permanganate, and ammonium permanganate; chlorates and perchlorates including barium chlorate, calcium chlorate, sodium perchlorate (monohydrate), strontium chlorate, magnesium perchlorate, zinc chlorate, sodium chlorate, ammonium perchlorate and potassium chlorate; periodates and iodates such as sodium periodate and potassium periodate; chlorites and hypochlorites such as lithium hypochlorite, calcium hypochlorite, and sodium chlorite; chlorinated and/or brominated isocyanurates such as sodium dichoroisocyanuric acid, potassium dichloroisocyanuric acid, and trichloroisocyanuric acid; inorganic acids such as nitric acid, chromic acid, and perchloric acid; peroxy acids such as meta-chloroperoxybenzoic acid; bromine, chlorine, iodine and fluorine; potassium superoxide; hydrates of any of the preceding; and combinations of any of the preceding.

The films are particularly suitable to produce unit dose packaging for sanitizing chemicals such as those used to disinfect pools, spas, and potable water. Sanitizing chemicals include chlorine-containing compounds which produce hypochlorous acid when contacted with water. Hypochlorous acid is the effective sanitizing agent, and the amount of hypochlorous acid which can be produced by a sanitizing chemical relative to chlorine gas ($Cl_2$) is referred to as "available chlorine content." The sanitizing agents may be provided as powder, granules, tablets, liquid, gel, or any other suitable form. Sanitizing agents include hypochlorite salts such as sodium hypochlorite, calcium hypochlorite, and lithium hypochlorite; chlorinated isocyanurates such as dichloroisocyanuric acid (also referred to as "dichlor" or dichloro-s-triazinetrione, 1,3-dichloro-1,3,5-triazinane-2,4, 6-trione) and trichloroisocyanuric acid (also referred to as "trichlor" or 1,3,5-trichloro-1,3,5-triazinane-2,4,6-trione). Salts and hydrates of the sanitizing compounds are also contemplated. For example, dichloroisocyanuric acid may be provided as sodium dichloroisocyanurate, sodium dichloroisocyanurate acid dihydrate, among others. Bromine containing sanitizing agents may also be suitable for use in unit dose packaging applications, such as 1,3-dibromo-5,5-dimethylhydantoin (DBDMH), 2,2-dibromo-3-nitrilipropionamide (DBNPA), dibromocyano acetic acid amide, 1-bromo-3-chloro-5,5-dimethylhydantoin; and 2-bromo-2-nitro-1,3-propanediol, among others.

The films described above may be formed into unit dose packaging by adding a predetermined amount of the harsh chemical, in granular, powder, liquid or tablet form, to the film and hermetically sealing the film around the oxidizing chemical to produce a dissolution packet that includes the active chemical agent.

The films described above may exhibit stability when in contact with harsh chemicals, including aggressive oxidizing chemicals. Stability, as used herein, refers to the films ability to maintain various physical and chemical properties, even under elevated temperature and long-term storage conditions, including a high degree of water-solubility, such as >85% dissolution at 21° C., low discoloration, and chemical resistance.

While various pyrrolidone comonomers are noted above, experimentation to date has shown that a synergistic effect may result with use of N-vinyl-2-pyrrolidone as the comonomer and dextrose as an additive. Such films may exhibit many of the properties of plasticized PVOH films, but may retain a high degree of flexibility and film integrity, but without loss of water solubility, even following exposure of the films to the harsh chemicals noted above. Such properties are desirable in harsh chemical packaging, as some handling is required for ultimate delivery of the unit dose package to the end target before dissolution, where such handling is typically performed after the film of the unit dose package has been aged or heat aged while in contact with the harsh chemical.

As described above, polyvinyl alcohol (PVOH) copolymers according to embodiments herein may be useful in harsh chemical packaging. In some embodiments, the composition may include a water-soluble saccharide, such as dextrose, and a polyvinyl alcohol copolymer consisting essentially of: (a) from 80 to 99 mole percent of vinyl alcohol and vinyl ester monomer, and (b) from 1 to 20 mole percent of a pyrrolidone comonomer, such as N-vinyl pyrrolidone. The polyvinyl alcohol copolymer may have a degree of hydrolysis in the range from about 65% to about 99%.

Film compositions disclosed herein may exhibit stability, including low discoloration and solubility in water, even after exposure to harsh chemicals and heat aging. In some embodiments, the film compositions disclosed herein may exhibit essentially no yellowing when exposed to a harsh chemical and aged at a temperature in the range from about 5° C. to about 54° C. for at least 4 weeks, such as at a temperature in the range from about 30° C. to about 54° C. for at least 4 weeks, at least 8 weeks, or at least 12 weeks. Essentially no yellowing, as used herein, refers to maintenance of a clear color, or the occurrence of a slight haze to a light yellowing in color due to reaction of the polyvinyl alcohol copolymer with the harsh chemical during the heat aging period.

While it is desirable to have 100% dissolution of the film compositions, some insolubility may result due to reaction of the polyvinyl alcohol copolymer with the hash chemical. Film compositions disclosed herein may nonetheless retain a high degree of solubility in water, after heat aging. For example, in some embodiments, the film compositions may have a percent dissolution in water at 21° C. of at least 85%, even following exposure to a harsh chemical and aging at a temperature in the range from about 5° C. to about 54° C. for at least 4 weeks. Some embodiments may retain a percent dissolution in water at 21° C. of at least 90%, even following exposure to a harsh chemical and aging at a temperature in the range from about 30° C. to about 54° C. for at least 6 weeks, 8 weeks, 12 weeks, or longer.

As noted above, the polyvinyl alcohol copolymers and film compositions disclosed herein may be useful in unit dose packages, including unit dose packages for harsh chemicals.

In some embodiments, the unit dose package may include a polymeric dissolution packet and a harsh chemical, where the polymeric dissolution packet includes: from 60 to 95 weight percent of a polyvinyl alcohol copolymer consisting essentially of: (a) from 80 to 99 mole percent of vinyl alcohol and vinyl ester monomer; and (b) from 4 to 12 mole percent of a pyrrolidone comonomer; from 1 to 40 weight percent dextrose; and from 1 to 5 weight percent polyethylene glycol. In other embodiments, the unit dose package may include a polymeric dissolution packet and a harsh chemical, where the polymeric dissolution packet includes: from 60 to 95 weight percent of a polyvinyl alcohol copolymer consisting essentially of: (a) from 80 to 99 mole percent of vinyl alcohol and vinyl ester monomer; and (b) from 4 to 12 mole percent of a pyrrolidone comonomer; from 1 to 10 weight percent dextrose; and from 1 to 20 weight percent polyethylene glycol. Such dissolution packets may be suitable for harsh chemicals such as dichloroisocyanuric acid, trichloroisocyanuric acid, and calcium hypochlorite, among others.

In some embodiments, the unit dose package may include a polymeric dissolution packet and a harsh chemical, where the polymeric dissolution packet includes: from 60 to 95 weight percent of a polyvinyl alcohol copolymer consisting essentially of: (a) from 80 to 99 mole percent of vinyl alcohol and vinyl ester monomer; and (b) from 4 to 12 mole percent of a pyrrolidone comonomer; from 1 to 40 weight percent dextrose; and from 1 to 15 weight percent of at least one of trimethylol propane and alkoxylated trimethylol propane. In other embodiments, the unit dose package may include a polymeric dissolution packet and a harsh chemical, where the polymeric dissolution packet includes: from 60 to 95 weight percent of a polyvinyl alcohol copolymer consisting essentially of: (a) from 80 to 99 mole percent of vinyl alcohol and vinyl ester monomer; and (b) from 4 to 12 mole percent of a pyrrolidone comonomer; from 1 to 10 weight percent dextrose; and from 1 to 20 weight percent of at least one of trimethylol propane and alkoxylated trimethylol propane. The polymeric dissolution packet may further include from 0.5 to 3 weight percent of at least one of ammonium chloride, citric acid, starch, potassium bicarbonate, and sodium bisulfate, and/or from 0.5 to 10 weight percent glycerine, such as 0.5 to 5 weight percent glycerine. Such a dissolution packet may be suitable for harsh chemicals such as 1-bromo-3-chloro-5,5-dimethylhydantoin, 2-bromo-2-nitro-1,3-propanediol, 1,3-dibromo-5,5-dimethylhydantoin, 2,3-dibromo-3-nitrilipropionamide, and dibromocyano acetic acid amide, among others.

Film compositions disclosed herein, as noted above, may be exhibit stability, including low discoloration and a high degree of solubility in water, even after exposure to harsh chemicals and heat aging. Such findings are in direct contrast to prior art teachings indicating that pyrrolidone containing polymers and sulfonate containing polymers are unsuitable for such applications, teaching instead that intricate tetrapolymers and specific additives are necessary. In contrast to these teachings, the compositions disclosed herein unexpectedly provide for the desired stability without requiring such intricate measures.

EXAMPLES

The compositions described herein were tested to determine their performance characteristics when used in harsh chemical packaging. The testing was performed according to the following test description. Films are prepared from the formulations by casting an aqueous solution of the composition onto a glass plate, which is leveled by gravity and allowed to dry to a moisture content in the range from about 6 wt % to about 15 wt %. An amount of the solution is added to the plate to provide for a film with a target thickness, which may depend on the sample target, such as 38 micron (about 1.5 mil) 50 micron (about 2 mil), 63 micron (about 2.5 mil), and 76 micron (about 3.0 mil), as noted in the tables below. The water in the solution is allowed to evaporate, and the resulting films are cut into an approximately 7.6 cm by 7.6 cm square (a 3-inch by 3-inch square) or a 7.6 cm by 6.3 cm rectangle (a 3-inch by 2.5-inch rectangle), as indicated. The film is then folded in half and three sides of the film are heat-sealed using a hand held heat-sealing gun. The resulting pouch is then filled with 15-20 grams of a harsh chemical, which may be in granular form, for example, and the fourth side of the pouch is heat sealed. The filled pouches are stored side-by-side in low density polyethylene bags between blue paper towels (to check for bleaching). The filled pouches are then stored at selected temperature conditions and aged for a selected time period. Following aging, the filled pouches are cut open and the chemical is removed. The film thickness is measured and color recorded, and the film is tested for water solubility. A sample of the film is mounted in a slide frame and placed in a 500 ml beaker filled with 400 ml water. The beaker is placed on a magnetic stirrer, and the water is stirred with a magnetic stir bar such that a vortex is created. The water temperature is maintained as noted, such as at about 21° C. The frame is secured in the beaker with a clamp which is supported by a platform such that stirring water pushes against the film. The film begins to balloon or wave. The disintegration time is recorded when the film balloon bursts. After disintegration, the frame remains in water and the dissolution time is recorded as the total time (inclusive of disintegration time) when no residual strings of film and no film particles remain on the frame. Following 15 minutes, the dissolution test is terminated and the percentage of the film dissolved is measured via filtration across a 325 mesh screen The vinyl alcohol—vinyl pyrrolidone compositions used in the Examples herein are summarized in Table 1. The following key may be used to discern the abbreviations as used in the tables below.

[1]Plasticizer: G: Glycerin; PEG: Polyethylene glycol (number average MW 200-1000); TMP: trimethylolpropane; PG: Propylene glycol

[2]Additive: D: Dextrose; CC: Citric acid; KC: Potassium chloride; $NH_4Cl$; ATMP: Alkoxylated-TMP; St: Starch, NaBS: Sodium bisulfite,

[3]Chemical: Dichlor: Dichloroisocyanuric; CalHypro: Calcium hypochlorite; Trichlor: Trichloroisocyanuric; BCDMH: 1-bromo-3-chloro-5,5-dimethylhydation; DBDMH: 1,3-dibromo-5,5-dimethylhydation; DBNPA: 2,3-dibromo-3-nitrilipropionamide

[4]Package coloration after aging; ⊖: no coloration, Δ: slightly yellow, X: discolored and brown.

TABLE 1

| Composition | PVOH-NVP copolymer (wt %) | Amount of co-monomer (mol %) | Plasticizer[1] (wt %) | Additive[2] (wt %) |
|---|---|---|---|---|
| 1 | 94 | 5 | PEG 4 | D 2 |
| 2 | 94 | 10 | PEG 4 | D 2 |
| 3 | 94 | 5 | TMP 4 | D 2 |
| 4 | 94 | 10 | TMP 4 | D 2 |
| 5 | 92 | 5 | PEG 2, G 4 | D 2 |
| 6 | 88 | 5 | G 10 | D 2 |
| 7 | 87 | 5 | TMP 10 | D 2, $NH_4Cl$ 1 |
| 8 | 87 | 5 | TMP 10 | D 2, CC 1 |
| 9 | 87 | 5 | TMP 10 | D 2, KC 1 |
| 10 | 89 | 5 | TMP 4, G 4 | D 2, St 0.5 |
| 11 | 85 | 5 | TMP 4, G 4, PG 4 | D 2, St 1 |

TABLE 1-continued

| Composition | PVOH-NVP copolymer (wt %) | Amount of co-monomer (mol %) | Plasticizer[1] (wt %) | Additive[2] (wt %) |
|---|---|---|---|---|
| 12 | 94 | 5 | TMP 4 | D 2 |
| 13 | 94 | 5 | TMP 4 | D 2 |
| 14 | 94 | 5 | TMP 4 | D 2 |
| 15 | 94 | 5 | PEG 4, | D 2 |

The above-described examples were compared to films formed from a vinyl alcohol—AMPS (2-acrylamido-2-methylpropanesulfonic acid) copolymer, having about 4 mole % AMPS. The compositions of the comparative examples are as detailed in Table 2.

TABLE 2

| Composition | PVOH-AMPS copolymer (wt %) | Amount of comonomer (mol %) | Plasticizer[1] (wt %) | Additive[2] (wt %) |
|---|---|---|---|---|
| Comp. 1 | 94 | 4 | PEG 4 | D 2 |
| Comp. 2 | 88 | 4 | TMP 10 | D 2 |
| Comp. 3 | 92 | 4 | PEG 2, G 4 | D 2 |
| Comp. 4 | 88 | 4 | G 10 | D 2 |
| Comp. 5 | 87 | 4 | TMP 10 | D 2, $NH_4Cl$ 1 |
| Comp. 6 | 87 | 4 | TMP 10 | D 2, NaBS 1 |
| Comp. 7 | 87 | 4 | ATMP 10 | D 2 |
| Comp. 8 | 87 | 4 | TMP 10 | D 2, CC 1 |
| Comp. 9 | 87 | 4 | TMP 10 | D 2, KC 1 |
| Comp. 10 | 91 | 4 | PEG 2, G 4 | D 2, KC 1 |
| Comp. 11 | 93 | 4 | PEG 2, G 4 | $NH_4Cl$ 1 |
| Comp. 12 | 90 | 4 | | D 10 |
| Comp. 13 | 86 | 4 | PEG 4 | D 10 |
| Comp. 14 | 85 | 4 | PEG 10 | D 5 |

Tables 3 and 4 provide the test conditions and results for the samples and comparative samples.

TABLE 3

| Composition | Compatibility/ Aging Temp and Time | Dissolution % | Chemical[3] | Coloration after chemical packaging[4] |
|---|---|---|---|---|
| 1 | 21° C., 6 weeks | 100 | Dichlor, Trichlor | ⊖ |
| 2 | 32° C., 4 weeks | 91 | BCDMH | Δ |
| 3 | 32° C., 4 weeks | 97 | BCDMH | ⊖ |
| 4 | 32° C., 4 weeks | 100 | BCDMH | ⊖ |
| 5 | 32° C., 8 weeks | 91 | BCDMH | Δ |
| 6 | 32° C., 8 weeks | 93 | BCDMH | Δ |
| 7 | 40° C., 4 weeks | 95 | DBNPA | Δ |

TABLE 3-continued

| Composition | Compatibility/ Aging Temp and Time | Dissolution % | Chemical[3] | Coloration after chemical packaging[4] |
|---|---|---|---|---|
| 8 | 32° C., 12 weeks | 100 | DBNPD | ○ |
| 9 | 32° C., 12 weeks | 100 | DBNPD | ○ |
| 10 | 40° C., 4 weeks | 99 | DBNPA | Δ |
| 11 | 40° C., 4 weeks | 85 | DBNPA | Δ |
| 12 | 5° C., 12 weeks | 100 | DBDMH | ○ |
| 13 | 25° C., 4 weeks | 100 | DBDMH | ○ |
| 14 | 40° C., 8 weeks | 99 | DBDMH | Δ |
| 15 | 40° C., 4 weeks | 93 | CalHypro | ○ |

TABLE 4

| Composition | Compatibility/ Aging Temp and Time | Dissolution %[3] | Chemical[4] | Coloration after chemical packaging |
|---|---|---|---|---|
| Comp. 1 | 21° C., 6 weeks | 100 | Dichlor | ○ |
| Comp. 2 | 40° C., 4 weeks | 100 | DBNPA | X |
| Comp. 3 | 40° C., 4 weeks | 100 | DBNPA | X |
| Comp. 4 | 40° C., 4 weeks | 100 | DBNPA | X |
| Comp. 5 | 40° C., 8 weeks | 100 | DBNPA | X |
| Comp. 6 | 40° C., 8 weeks | 100 | DBNPA | X |
| Comp. 7 | 40° C., 8 weeks | 93 | DBNPA | X |
| Comp. 8 | 40° C., 8 weeks | 85 | DBNPA | X |
| Comp. 9 | 40° C., 4 weeks | 100 | DBNPA | Δ |
| Comp. 10 | 40° C., 4 weeks | 99 | DBNPA | X |
| Comp. 11 | 40° C., 4 weeks | 80 | DBNPA | Δ |
| Comp. 12 | 40° C., 4 weeks | 98 | CalHypro | ○ |
| Comp. 13 | 40° C., 4 weeks | 88 | Dichlor | ○ |
| Comp. 14 | 40° C., 4 weeks | 88 | Dichlor | ○ |

Table 5 summarizes some of the test results for samples and comparative samples used with a dichlorinated harsh chemical, such as dichloroisocyanuric acid, dichloro-s-triazinetrione or 1,3-dichloro-1,3,5-triazinane-2,4,6-trione.

TABLE 5

| | Composition # | | | | | |
|---|---|---|---|---|---|---|
| | Comp. 1 | 1 | 1 | Comp. 1 | 1 | 1 |
| Film Thickness | 2.5 mil | 1.5 mil | 2.8 mil | 2.5 mil | 1.5 mil | 2.8 mil |
| Compatibility/Aging Temp and Time | 21.1 C./6 weeks | 21.1 C./6 weeks | 21.1 C./6 weeks | 40 C./6 weeks | 40 C./6 weeks | 40 C./6 weeks |
| Dissolution, %** | 100 | 100 | 100 | 91 | 94 | 98 |
| Coloration | ○ | ○ | ○ | ○ | ○ | ○ |

Table 6 summarizes test conditions and results for some of the samples and comparative samples used with a trichlorinated harsh chemical, such as trichloroisocyanuric acid or 1,3,5-trichloro-1,3,5-triazinane-2,4,6-trione.

TABLE 6

| | Composition # | |
|---|---|---|
| | 1 | 1 |
| Film Thickness | 1.5 mil | 1.5 mil |
| Compatibility/Aging Temp and Time | 21.1 C./4 weeks | 40 C./4 weeks |
| Dissolution, %** | 98 | 97 |
| Coloration | ○ | X |

Table 7 summarizes test conditions and results for some of the samples and comparative samples used with calcium hypochlorite as the harsh chemical.

TABLE 7

| Calcium Hypochlorite | |
|---|---|
| | Composition # |
| | 1 |
| Film Thickness | 1.5 |
| Compatibility/Aging Temp and Time | 40 C./4 weeks |
| Dissolution, %, 21 C.** | 93 |
| Coloration | ○ |

Tables 8 and 9 summarize test conditions and results for some of the samples and comparative samples used with a bromicide, 1-bromo-3-chloro-5,5-dimethylhydantoin (BCDMH), and a bronopol, 2-bromo-2-nitro-1,3-propanediol (DBNPD).

TABLE 8

| BCDMH | | | | | | |
|---|---|---|---|---|---|---|
| | Film Formula | | | | | |
| | 1 | 2 | 3 | 4 | 5 | 6 |
| Film Thickness | 3.0 | 3.0 | 3.0 | 3.0 | 2.5 | 3.0 |
| Compatibility/ Aging Temp and Time | 32 C./1 month | 32 C./1 month | 32 C./1 month | 32 C./1 month | 32 C./2 month | 32 C./2 month |
| Dissolution, %, 21 C.** | 88 | 91 | 97 | 100 | 91 | 93 |
| Coloration | Δ | Δ | ○ | Δ | Δ | Δ |

TABLE 9

DBNPD

| | Composition # | | | | |
|---|---|---|---|---|---|
| | Comp. 2 | 3 | 7 | 8 | 9 |
| Film Thickness | | 2.0 | 2.0 | 2.0 | 2.0 |
| Compatibility/ Aging Temp and Time | 32 C./3 months | 32 C./3 months | 32 C./3 months | 32 C./3 months | 32 C./3 months |
| Dissolution, %, 21 C.** | 100 | 100 | 100 | 100 | 100 |
| Coloration | Δ | ○ | ○ | ○ | ○ |

Tables 10 and 11(A and B) summarize test conditions and results for some of the samples and comparative samples used with 1,3-dibromo-5,5-dimethylhydantoin (DBDMH), 2,2-dibromo-3-nitrilipropionamide (DBNPA), or dibromocyano acetic acid amide.

TABLE 10

DBDMH

| | Composition # | | |
|---|---|---|---|
| | 3 | 3 | 3 |
| Film Thickness | 3.0 | 3.0 | 3.0 |
| Compatibility/ Aging Temp and Time | 5 C./1 month | 25 C./1 month | 40 C./2 month |
| Dissolution, %, 21 C.** | 100 | 100 | 98 |
| Coloration | ○ | ○ | Δ |

As shown by the above examples, vinyl alcohol-vinyl pyrrolidone copolymers may be suitable for use in packaging harsh chemicals. Specifically, various samples retained a clear appearance, indicating a high film stability (i.e., high resistance to attack by the harsh chemicals). Further, even where some color formation occurred, the samples retained excellent water solubility and physical strength. Film compositions disclosed herein may thus be suitable for use as a harsh chemical packaging film, even where significant aging times may lapse at elevated temperatures prior to use of the packet by an end consumer.

As described above, it has also been found that the vinyl alcohol copolymers containing pyrrolidone comonomers may be advantageously used in admixture with polyvinyl alcohol copolymers including comonomers containing sulfonic acid groups. Films and unit dose packages were formed with a mixture of VOH-NVP copolymer (5 mole % NVP) and VOH-AMPS copolymer (4 mole % AMPS), as formulated in Table 12. The unit dose packages were contacted with various chemicals and tested according to the procedures described above (2,2-dibromo-3-nitrilipropionamide (DBNPA) at 54° C.), the results of which are shown in Table 13, and various comparisons are shown in Tables 14A and B.

TABLE 12

| Composition Unit | PVOH-AMPS copolymer (4 mol % AMPS) wt % | PVOH-NVP copolymer (5 mol % NVP) wt % | Plasticizer[1] wt % | Additive[2] wt % |
|---|---|---|---|---|
| 16 | 69 | 23 | PEG 2, G 4 | D 2 |
| 17 | 23 | 69 | PEG 2, G 4 | D 2 |

TABLE 11A

DBNPA

| | Composition # | | | | | | |
|---|---|---|---|---|---|---|---|
| | Comp. 1 | 3 | 3 | 2 | Comp. 2 | Comp. 5 | Comp. 6 | Comp. 7 |
| Film Thickness | 2.5 | 3.0 | 3 | 3.0 | | | | |
| Compatibility/ Aging Temp and Time | 40 C./3 months | 5 C./3 month | 25 C./3 month | 40 C./2 months | 40 C./1 month | 40 C./2 months | 40 C./2 months | 40 C./2 months |
| Dissolution, %, 21 C.** | 98 | 100 | 72 | 93 | 100 | 100 | 100 | 93 |
| Coloration | X | X | X | ○ | X | X | X | X |

TABLE 11B

DBNPA

| | Sample # | | | | | | | | |
|---|---|---|---|---|---|---|---|---|---|
| | 1 | 7 | 7 | Comp. 8 | Comp. 9 | 7 | 7 | Comp. 10 | Comp. 11 |
| Film Thickness | 3.0 | 2.0 | 2.0 | | | 2.0 | 2.0 | | |
| Compatibility/ Aging Temp and Time | 40 C./1 month | 40 C./2 month | 40 C./2 month | 40 C./2 months | 40 C./1 month | 40 C./1 month | 40 C./1 month | 40 C./1 month | 40 C./2 month |
| Dissolution, %, 21 C.** | 94 | 45 | 33 | 85 | 100 | 95 | 95 | 99 | 80 |
| Coloration | Δ | Δ | Δ | X | Δ | Δ | Δ | X | Δ |

TABLE 12-continued

| Composition Unit | PVOH-AMPS copolymer (4 mol % AMPS) wt % | PVOH-NVP copolymer (5 mol % NVP) wt % | Plasticizer[1] wt % | Additive[2] wt % |
|---|---|---|---|---|
| 18 | 68 | 23 | PEG 2, G 4 | D 2, NH$_4$Cl 2 |
| 19 | 68 | 23 | PEG 2, G 4 | NH$_4$Cl 3 |
| 20 | 68 | 23 | PEG 2, G 4 | CC 3 |
| 21 | 23 | 68 | PEG 2, G 4 | D 2, NH$_4$Cl 2 |
| 22 | 23 | 68 | PEG 2, G 4 | NH$_4$Cl 2 |
| 23 | 23 | 68 | PEG 2, G 4 | CC 3 |
| 24 | 68 | 23 | PEG 2, G 4 | CC 3 |
| 25 | 68 | 23 | PEG 2, G 4 | CC 3 |
| 26 | 64 | 21 | PEG 10 | D 5 |

TABLE 13

| Composition Unit | Compatibility/Aging Temp and Time | Dissolution[3] % | Chemical[4] | Coloration after chemical packaging |
|---|---|---|---|---|
| 16 | 54° C., 4 weeks | 80 | DBNPA | X |
| 17 | 54° C., 4 weeks | 72 | DBNPA | X |
| 18 | 54° C., 4 weeks | 76 | DBNPA | X |
| 19 | 54° C., 4 weeks | 66 | DBNPA | X |
| 20 | 54° C., 4 weeks | 85 | DBNPA | Δ |
| 21 | 54° C., 4 weeks | 77 | DBNPA | X |
| 22 | 54° C., 4 weeks | 57 | DBNPA | X |
| 23 | 54° C., 4 weeks | 69 | DBNPA | X |
| 24 | 40° C., 12 weeks | 92 | DBNPA | Δ |
| 25 | 30° C., 16 weeks | 99 | DBNPA | Δ |
| 26 | 54° C., 4 weeks | 85 | DBNPA | X |

TABLE 14A

| | Composition | | | |
|---|---|---|---|---|
| | 16 | 17 | 18 | 19 |
| 2-weeks exposure | | | | |
| % Dissolution | 85 | 76 | 81 | |
| Coloration | X | X | Δ | Δ |
| 4-weeks exposure | | | | |
| % Dissolution | 80 | 72 | 76 | 66 |
| Coloration | X | X | X | X |

TABLE 14B

| | Composition | | | |
|---|---|---|---|---|
| | 20 | 21 | 22 | 23 |
| 2-weeks exposure | | | | |
| % Dissolution | 93 | 72 | | 76 |
| Color | Δ | Δ | | Δ |

TABLE 14B-continued

| | Composition | | | |
|---|---|---|---|---|
| | 20 | 21 | 22 | 23 |
| 4-weeks exposure | | | | |
| % Dissolution | 85 | 77 | 57 | 69 |
| Coloration | Δ | X | X | X |

As described above, embodiments disclosed herein relate to water-soluble polyvinyl alcohol compositions and films formed therefrom that exhibit resistance to aggressive oxidizing chemicals. Advantageously, embodiments disclosed herein may provide for water soluble film compositions that exhibit stability, retaining a high degree of water solubility, a high degree of film integrity, and a high degree of flexibility, as well as low discoloration, even following extended exposure to harsh chemicals at elevated temperatures. Such films may thus be suitable for use in unit dose packaging of harsh chemicals, providing an extended shelf life, handling safety, and other benefits as may be readily envisioned by one skilled in the art.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A water-soluble film having stability with harsh chemicals, the film comprising:
   a polyvinyl alcohol copolymer A consisting essentially of:
      (a) from 95 to 99 mole percent of vinyl alcohol and vinyl ester monomer; and
      (b) from 1 to about 5 mole percent of a pyrrolidone comonomer;
   a polyvinyl alcohol copolymer B comprising:
      (a) from 94 to 99 mole percent of vinyl alcohol and vinyl ester monomer; and
      (b) from 1 to 6 mole percent of a comonomer comprising sulfonic acid groups; and
   at least one water-soluble monosaccharide having a solubility in water at 25° C. of at least 0.1 moles per liter;
   wherein the water-soluble film comprises from about 20 wt % to about 30 wt % copolymer A and from about 70 wt % to about 80 wt % copolymer B, based on a total amount of copolymers A and B.

2. The film of claim 1, wherein the film has a % dissolution in water at 21° C. of at least 85% following exposure to an oxidizing chemical and aging at a temperature in the range from about 5° C. to about 54° C. for at least 4 weeks.

3. The film of claim 1, wherein the film exhibits essentially no yellowing when exposed to an oxidizing chemical and aged at a temperature in the range from about 5° C. to about 54° C. for at least 4 weeks.

4. The film of claim 1, wherein the polyvinyl alcohol copolymer A contains from 4 to about 5 mole percent of the pyrrolidone comonomer.

5. The film claim 1, wherein the pyrrolidone comonomer comprises N-vinyl pyrrolidone.

6. The film of claim 1, wherein the film comprises from about 1 to about 10 weight percent of the water-soluble saccharide.

7. The film of claim 1, wherein the at least one water-soluble monosaccharide comprises dextrose.

8. The film of claim 1, further comprising at least one of a plasticizer, a bromine scavenger, and a chlorine scavenger.

9. The film of claim 1, further comprising at least one of polyethylene glycol, glycerine, ammonium chloride, citric acid, trimethylol propane, alkoxylated trimethylol propane, potassium bicarbonate, and ammonium chloride, polypropylene glycol, starch, and sodium bisulfite.

10. The film of claim 1, wherein the comonomer comprising sulfonic acid groups comprises 2-acrylamido-2-methylpropanesulfonic acid.

11. A unit dose package comprising:
a polymeric dissolution packet comprising the film of claim 1; and
a chemical sealed in the polymeric dissolution packet.

12. The unit dose package of claim 11, wherein the chemical comprises at least one of a peroxide, a nitrate, a nitrite, a chromate, a persulfate, a borate, a bromate, a chlorate, a periodate, a chlorite, a chlorinated or brominated isocyanurate, an inorganic acid, a peroxy acid, bromine, chorine, iodine, fluorine, potassium superoxide, and salts and hydrates of these compounds.

13. The unit dose package of claim 11, wherein the polymeric dissolution packet comprises:
from 60 to 95 weight percent of the polyvinyl alcohol copolymer;
from 1 to 40 weight percent dextrose; and
from 0 to 5 weight percent polyethylene glycol.

14. The unit dose package of claim 13, wherein the chemical comprises at least one of dichloroisocyanuric acid, trichloroisocyanuric acid, and calcium hypochlorite.

15. The unit dose package of claim 11, wherein the polymeric dissolution packet comprises:
from 60 to 95 weight percent of the polyvinyl alcohol copolymer;
from 1 to 40 weight percent dextrose; and
from 0 to 15 weight percent of at least one of trimethylol propane and alkoxylated trimethylol propane.

16. The unit dose package of claim 15, wherein the polymeric dissolution packet further comprises from 0.5 to 3 weight percent of at least one of ammonium chloride, citric acid, potassium bicarbonate, starch, and sodium bisulfite.

17. The unit dose package of claim 15, wherein the polymeric dissolution packet further comprises from 0.5 to 10 weight percent glycerine.

18. The unit dose package of claim 15, wherein the oxidizing chemical comprises at least one of 1-bromo-3-chloro-5,5-dimethylhydantoin, 2-bromo-2-nitro-1,3-propanediol, 1,3-dibromo-5,5-dimethylhydantoin, 2,3-dibromo-3-nitrilopropionamide, and dibromocyano acetic acid amide.

* * * * *